US007952462B2

(12) United States Patent
Fang

(10) Patent No.: US 7,952,462 B2
(45) Date of Patent: May 31, 2011

(54) REMOTE CONTROLLED POWER SWITCH

(75) Inventor: Jui-Kuang Fang, Taipei (TW)

(73) Assignee: Livinglab Development Co., Ltd., Taipei (TW)

( * ) Notice: Subject to any disclaimer, the term of this patent is extended or adjusted under 35 U.S.C. 154(b) by 1022 days.

(21) Appl. No.: 11/808,714

(22) Filed: Jun. 12, 2007

(65) Prior Publication Data

US 2008/0174413 A1 Jul. 24, 2008

(30) Foreign Application Priority Data

Jan. 24, 2007 (TW) .............................. 96102609 A

(51) Int. Cl.
*G05B 19/02* (2006.01)

(52) U.S. Cl. .................... 340/4.3; 340/825.69; 700/298; 700/297; 700/286

(58) Field of Classification Search ............. 340/825.22, 340/310.11, 825.69; 323/237, 320; 700/286, 700/297, 298

See application file for complete search history.

(56) References Cited

U.S. PATENT DOCUMENTS

| | | | | | |
|---|---|---|---|---|---|
| 4,728,949 | A * | 3/1988 | Platte et al. | .............. | 340/825.37 |
| 5,097,249 | A * | 3/1992 | Yamamoto | ............... | 340/538.17 |
| 5,175,441 | A * | 12/1992 | den Hollander | ................ | 307/43 |
| 5,189,412 | A * | 2/1993 | Mehta et al. | ............. | 340/825.22 |
| 5,831,391 | A * | 11/1998 | MacKay | ....................... | 315/159 |
| 5,994,883 | A * | 11/1999 | Liu | ............................... | 323/237 |
| 6,297,746 | B1 * | 10/2001 | Nakazawa et al. | ....... | 340/825.69 |
| 7,274,303 | B2 * | 9/2007 | Dresti et al. | ............. | 340/825.72 |
| 7,675,453 | B2 * | 3/2010 | Kang et al. | ..................... | 341/176 |
| 2007/0226344 | A1 * | 9/2007 | Sparrell et al. | ................ | 709/226 |

FOREIGN PATENT DOCUMENTS

| | | | |
|---|---|---|---|
| KR | 20-0296782 | Y1 | 12/2002 |
| KR | 10-2004-0067510 | A | 7/2004 |

* cited by examiner

*Primary Examiner* — Benjamin C Lee
*Assistant Examiner* — Peter C Mehravari

(57) ABSTRACT

The invention provides a remote controlled power switch including a line interface, a radiation-based receiver and a processor. The line interface is electrically connected in series to a power line. The radiation-based signal receiver functions as receiving a radiation-based signal and converting the radiation-based signal into an operative code. And, the processor controls, based on the operative code, the line interface to cut off or provide transmission of electric power transmitted through the power line.

3 Claims, 3 Drawing Sheets

182

| Second operative code | Commands |
|---|---|
| 101 | Provide |
| 103 | Cut off |
| 105 | Switch |
| 301 | 0.1 A |
| 303 | 0.2 A |
| 305 | 0.3 A |
| 307 | 0.4 A |
| 309 | 0.5 A |
| ⋮ | ⋮ |

FIG. 2

REMOTE CONTROLLED POWER SWITCH

BACKGROUND OF THE INVENTION

1. Field of the Invention

The present invention relates to a remote controlled power switch and, in particular, to the one that users can undoubtedly cut off the transmission of electric power, connect electric power, or switch the toggle between On/Off states with radiation-based signal control (e.g. infrared remote control).

2. Description of the Prior Art

A power switch is the only internal or peripheral component used to turn on/off electric equipment. Currently, a power switch can be incorporated with infrared technologies to become a remote controlled power switch.

However, for present remote controlled power switches, users can only switch states of power with a remote controller. In other words, users cannot undoubtedly cut off or turn on electric power with present remote controlled power switches. Accordingly, it is inconvenient for users, and electric power may be senselessly wasted. For example, with traditional remote controlled power switches, sometimes users cannot make sure whether power of electric equipment is really turned off in a rush before going out. Therefore, it's necessary to develop a remote controlled power switch that can absolutely cut off or turn on electric power.

Recently, some IT companies enthusiastically have integrated home networking and external networking to develop electronic and intelligent-life circumstances, such as home power management, home security, home care, remote maintenance of appliances, digital interactive TV, etc. With the expectations of having an electronic and intelligent life, it is believed that users are in need of making sure whether electric power is undoubtedly cut off or turned on.

Accordingly, one objective of the invention is to provide a remote controlled power switch that users can undoubtedly turn on/off power or switch between the states of ON and OFF with radiation-based signals control (e.g. infrared remote control).

Besides, living in the circumstances of electronic and intelligent life, it is believed that users are in need of remote controlled power switches that can provide assistance in power management, home security, etc.

Therefore, another objective of the invention is to provide a remote controlled power switch that can provide assistance in power management, home security, etc.

SUMMARY OF THE INVENTION

In one preferred embodiment according to this invention, a remote controlled power switch includes a line interface, a radiation-based receiver, a processor, and a power supply. The line interface is electrically connected in series to a power line. The line interface is capable of being controlled to cut off or provide transmission of a first electric power transmitted over the power line. The radiation-based receiver is used for receiving a first radiation-based signal and converting the first radiation-based signal into a first operative code. The processor is electrically connected to the line interface and the radiation-based receiver, respectively. The processor therein stores a look-up table that records plural second operative codes and plural commands. The plural commands include a cutting-off command, a connecting command, and a toggling command. Each of the commands is corresponding to one of the second operative codes. The processor receives the first operative code from the radiation-based receiver and judges if the first operative code could match one of the second operative codes. If the judging result is YES, the processor controls the line interface according to the command corresponding to the second operative code that matches the first operative code. And, the power supply is used for supplying a second electric power to the remote controlled power switch.

The advantage and spirit of the invention may be understood by the following recitations together with the appended drawings.

BRIEF DESCRIPTION OF THE APPENDED DRAWINGS

In FIG. 1B, the line interface in FIG. 1A is a triac.

FIG. 2 illustrates an example of the look-up table 182 in the remote controlled power switch 1 according to an embodiment of the invention.

DETAILED DESCRIPTION OF THE INVENTION

The invention provides a remote controlled power switch connected in series to a power line. The remote controlled power switch is used for remotely controlling transmission of electric power over the power line. Specifically, with the remote controlled power switch and radiation-based signals, users can undoubtedly cut off transmission of the electric power, connect electric power, or switch between the two states of ON and OFF. Several preferred embodiments, according to the invention, are described below to explain the characteristics, spirit, advantages and convenience of the invention.

Figure 1A:
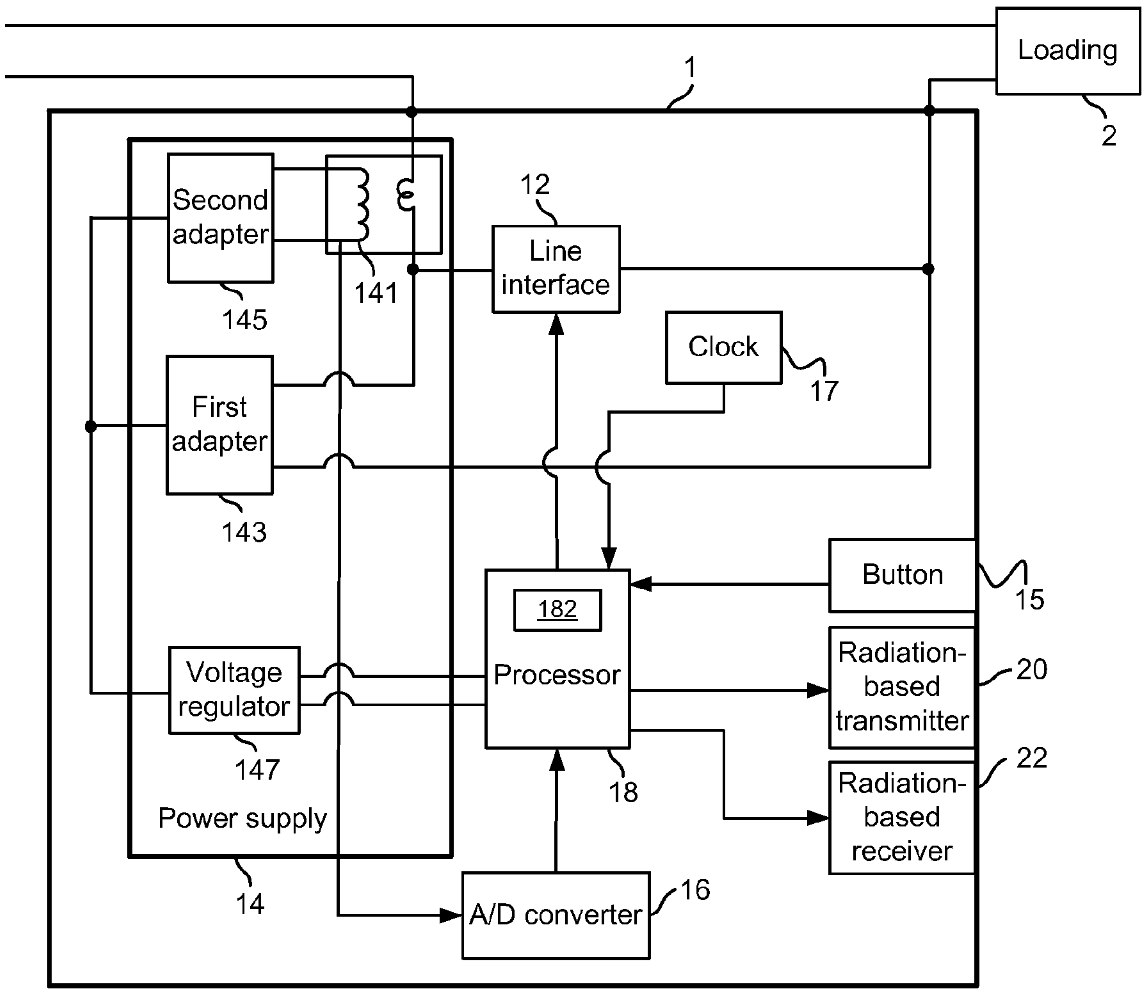
FIG. 1A illustrates the block diagram of the remote controlled power switch 1 in one preferred embodiment according to this invention.

Please refer to FIG. 1A, which illustrates the block diagram of a remote controlled power switch 1 in one preferred embodiment according to the invention. The remote controlled power switch 1 includes a line interface 12, a power supply 14, a processor 18, and a radiation-based receiver 22.

Figure 1B:
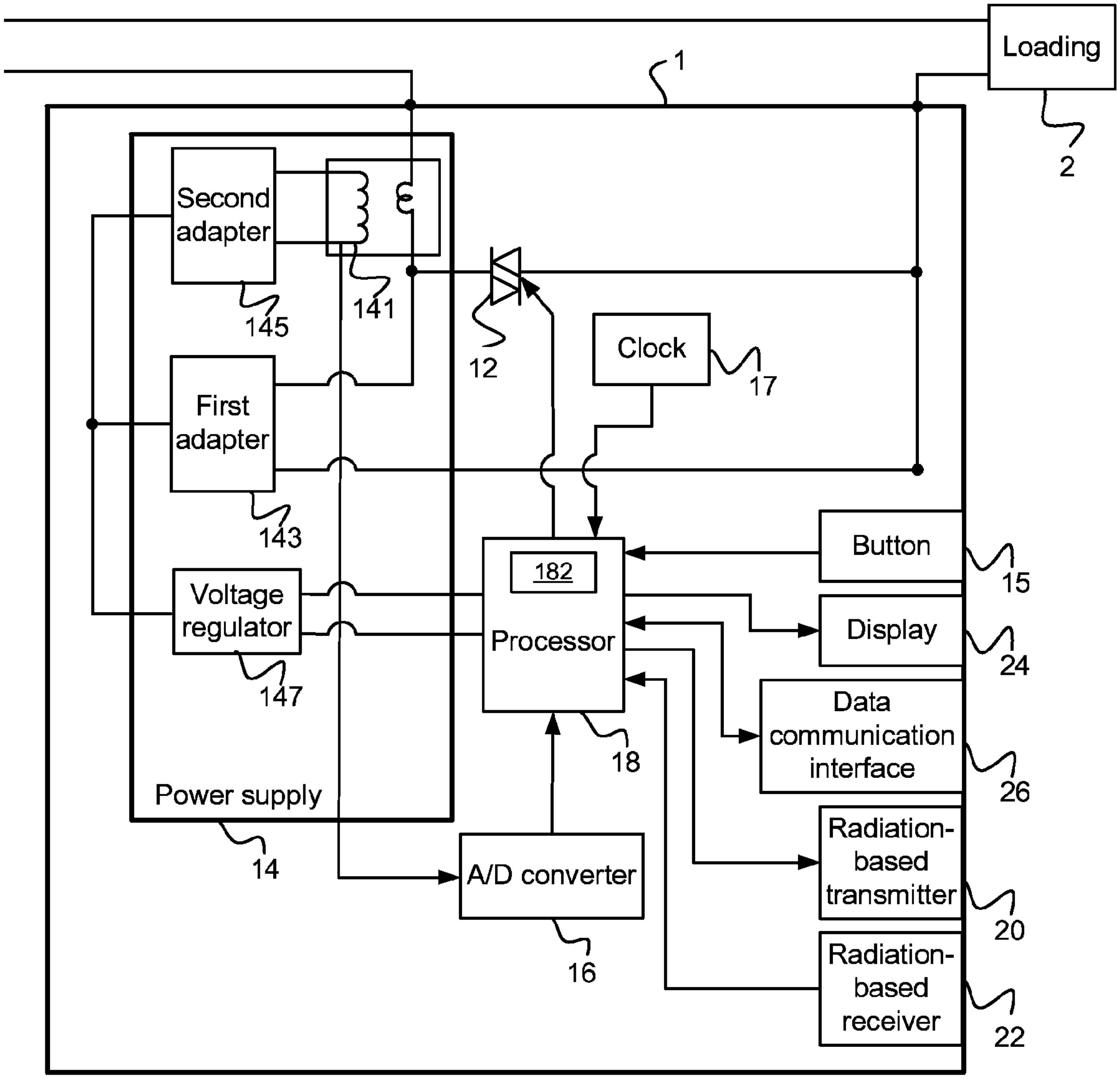
FIG. 1B illustrates another block diagram of the remote controlled power switch 1 in the preferred embodiment according to this invention.

As shown in FIG. 1A, the line interface 12 is connected in series to one power line between two power lines for transmitting a first electric power to a loading 2. The line interface 12 is capable of being controlled to cut off or provide transmission of the first electric power through the power line. Please refer to FIG. 1B, which illustrates another block diagram of the remote controlled power switch 1. In FIG. 1B, the line interface 12 is a triac. Besides, the line interface 12 can also be a relay (not shown in FIG. 1A and FIG. 1B).

It should be noted that the remote controlled power switch 1 can be a peripheral power switch connected to the loading (electric equipment) 2. And, the remote controlled power switch 1 can also be a power switch integrated into the loading (electric equipment) 2. For instance, the loading 2 may be an extended line or similar electronic equipment.

The remote controlled power switch 1, further, includes at least one button 15 electrically connected to the processor 18. In response to pressing the button 15, the processor 18 controls the line interface 12 to cut off transmission of the first electric power, connect the first electric power, or switch between the two states.

Also as shown in FIG. 1A, the radiation-based receiver 22 is used for receiving a first radiation-based signal and converting the first radiation-based signal into a first operative code. The first radiation-based signal may be transmitted from a remote controller (not shown in FIG. 1A).

In one embodiment, the first radiation-based signal is an infrared signal and the radiation-based receiver 22 is an infrared receiver.

Also as shown in FIG. 1A, the processor 18 is electrically connected to the line interface 12 and the radiation-based receiver 22, respectively. The processor 18 stores a look-up table 182 that records plural second operative codes and plural commands. The plural commands include a cutting-off command, a connecting command, and a toggling command. Each of the commands is corresponding to one of the second operative codes. The processor 18 receives the first operative code from the radiation-based receiver 22 and judges if the first operative code could match one of the second operative codes. If the judging result is YES, the processor 18 controls the line interface 12 according to the command corresponding to the second operative code that matches the first operative code.

Also as shown in FIG. 1A, the power supply 14 is electrically connected to the line interface 12 and the processor 18, respectively. The power supply 14 supplies a second electric power for operation of the remote controlled power switch 1.

It should be noted that the cutting-off command is used to cut off transmission of the first electric power, such that at least one loading (electric equipment) utilizing the first electric power is turned into an OFF state. The connecting command is used to provide transmission of the first electric power, such that at least one loading (electric equipment) utilizing the first electric power is turned into an ON state. The toggling command is used to cut off or provide transmission of the first electric power, such that at least one loading (electric equipment) utilizing the first electric power is switched between ON/OFF states. If electric equipment is in an OFF state, when the processor 18 in the remote controlled power switch 1 receives the toggling command, the electric equipment will be switched into an ON state. Similarly, if the processor 18 in the remote controlled power switch 1 receives the toggling command again, the electric equipment will be switched into an OFF state from the ON state.

Based on the descriptions above, it can be clearly understood that, with the remote controlled power switch 1 according to this invention, users can undoubtedly and remotely cut off or provide transmission of the electric power.

Also as shown in FIG. 1A, in one embodiment, the power supply 14 can include a converter 141, a first adapter 143, a second adapter 145, and a voltage regulator 147. The converter 141 is electrically connected to the power line and used for converting the first electric power into a third electric power. The first adapter 143 is electrically connected in parallel to the line interface 12 and used for receiving a fourth electric power from the line interface 12. The second adapter 145 is electrically connected to the converter 141 and used for receiving the third electric power from the converter 141. The voltage regulator 147 is electrically connected to the first adapter 143 and the second adapter 145, respectively. The voltage regulator 147 is used for regulating and converting the third or the fourth electric power into the second electric power. In another embodiment, the power supply 14 can be a battery.

In another embodiment, the aforementioned first adapter 143 and the second adapter 145 can be integrated into a double-adapter.

In addition to the commands, the remote controlled power switch 1 can also judge whether to cut off transmission of the first electric power based on a current of the first electric power, so as to ensure safety. In this embodiment, the converter 141 is also used to detect a loading current flowing through the line interface 12. As shown in FIG. 1A, the remote controlled power switch 1 further includes an A/D converter 16. The A/D converter 16 is electrically connected to the converter 141 and the processor 18, respectively. The A/D converter 16 converts the loading current detected by the converter 141 into a current value and transmits the current value to the processor 18. The processor 18 then judges whether the current value is higher than a user-defined threshold or not. If the judging result is YES, the processor 18 will control the line interface to cut off transmission of the first electric power.

In order for users to query the current value of the first electric power, in another embodiment, the remote controlled power switch 1 further includes a radiation-based transmitter 20, as shown in FIG. 1A and FIG. 1B. The radiation-based transmitter 20 is electrically connected to the processor 18. In addition, the plural commands include a current-replying command. In response to the current-replying command, the processor 18 receives the current value from the A/D converter 16 and interprets the current value into one of the second operative codes. Then, the processor 18 transmits a second radiation-based signal that represents the interpreted second operative code to a remote controller via the radiation-based transmitter 20.

Please refer to FIG. 2, which illustrates an example of the look-up table 182 stored in the processor 18.

For users to query the state of the remote controlled power switch 1, in another embodiment, the remote controlled power switch 1 can also include the radiation-based transmitter 20 above. In this embodiment, the processor 18 also records a switching state. The switching state is relative to a transmission state of the first electric power over the power line. The plural commands further include a state-replying command. In response to the state-replying command, the processor 18 interprets the switching state as one of the second operative codes. Subsequently, the processor 18 transmits a second radiation-based signal that represents the interpreted second operative code to the remote controller via the radiation-based transmitter 20.

In another embodiment, the remote controlled power switch 1 further includes the above mentioned radiation-based transmitter 20 and a clock 17 The clock 17 and the radiation-based transmitter 20 are respectively electrically connected to the processor 18. A user-defined period is stored in the processor 18. The processor 18 receives the current value from the A/D converter 16 and judges whether the current value is received in the user-defined period or not. If the judging result is YES, the processor 18 will control the line interface 12 to cut off transmission of the first electric power and transmit, via the radiation-based transmitter, a third radiation-based signal that is an alerting signal.

Users can set, for instance, a period time of going-out or a period time of sleeping in the aforementioned user-defined period. Normally, the remote controlled power switch 1 is not turned on during these periods. Namely, during the user-defined periods, if the remote controlled power switch 1 inside or peripherally connected to electric equipment is turned on, the processor 18 will receive the current value from the A/D converter 16 and control the line interface 12 to cut off power over the power line. Thus, invaders cannot arbitrarily steal or destroy things in the house. At the same time, the processor 18 will control the radiation-based transmitter 20 to transmit an alarm to the radiation-based receiver 22. Then, the alarm signal will be used for triggering various alarm systems. And, the alarm signal will also be transmitted to users or police offices. In this way, the remote controlled power switch 1, according to this invention, can provide home security.

In one embodiment, the processor 18 controls the line interface 12 and limits a loading current flowing through the line interface 12 based on a predetermined current limit. In this way, the remote controlled power switch 1, according to this invention, can provide power management.

In actual applications, the remote controlled power switch, according to this invention, can be equipped with various operation or communication interfaces. Please refer back to FIG. 1B. The remote controlled power switch 1 in another embodiment according to this invention further includes a display 24 and a data communication interface 26.

The display 24 is electrically connected to the processor 18. The display is operated by the processor 18 and used for displaying the second operative codes and the commands.

The data communication interface 26 is also electrically connected to the processor 18. The data communication interface 26 is configured to be connected to external electronic equipment; for example, home gateway of the home networking. In this way, users can directly connect to their home network and control the remote controlled power switch 1 without a remote controller.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A remote controlled power switch, comprising:

a line interface, electrically connected in series to a power line, capable of being controlled to cut off or provide transmission of a first electric power transmitted through the power line;

a radiation-based receiver, for receiving a first radiation-based signal and converting the first radiation-based signal into a first operative code;

a processor, electrically connected to the line interface and the radiation-based receiver, the processor therein storing a look-up table recording plural second operative codes and plural commands, the plural commands comprising a cutting-off command, a connecting command, and a toggling command, each of the commands corresponding to one of the second operative codes, the processor receiving the first operative code from the radiation-based receiver and judging if the first operative code matches one of the second operative codes, and if the judging result is YES, the processor controlling the line interface according to the command corresponding to the second operative code that matches the first operative code;

a power supply, for supplying a second electric power to the remote controlled power switch, the power supply comprising:

a converter, electrically connected to the power line, for converting the first electric power into a third electric power;

a first adapter, electrically connected in parallel to the line interface, for receiving a fourth electric power from the line interface;

a second adapter, electrically connected to the converter, for receiving the third electric power from the converter; and a voltage regulator, electrically connected to the first adapter and the second adapter, for regulating and converting the third electric power or the fourth electric power into the second electric power; and an A/D converter electrically connected to the converter and the processor, wherein the converter also detects a loading current that flows through the line interface, the A/D converter converts the loading current detected by the converter into a current value and transmits the current value to the processor; the processor judges whether the current value is higher than a user-defined threshold, and if the judging result is YES, the processor will control the line interface to cut off transmission of the first electric power.

2. The remote controlled power switch of claim 1, further comprising a radiation-based transmitter electrically connected to the processor, wherein the converter is also electrically connected to the processor, the commands also comprise a current-replying command, in response to the current-replying command, the processor receives the current value from the A/D converter, interprets the current value as one of the second operative codes, and transmits, via the radiation-based transmitter, a second radiation-based signal that represents the interpreted second operative code.

3. The remote controlled power switch of claim 1, further comprising a clock and a radiation-based transmitter, wherein the converter is electrically connected to the processor, the clock and the radiation-based transmitter are also electrically connected to the processor, respectively, a user-defined period is stored in the processor, the processor receives the current value from the A/D converter and judges whether the current value is received in the user-defined period, if the judging result is YES, the processor will control the line interface to cut off transmission of the first electric power and transmits, via the radiation-based transmitter, a third radiation-based signal that is an alerting signal.

* * * * *